`Patented Nov. 22, 1932`

`1,888,626`

UNITED STATES PATENT OFFICE

WILHELM ECKERT AND OTTO BRAUNSDORF, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

SEPARATION OF NEW VAT DYESTUFF ISOMERS

No Drawing. Application filed April 4, 1930, Serial No. 441,713, and in Germany May 10, 1929.

In the U. S. Patent 1,588,451 there is described a process which comprises condensing a 1.4.5.8-naphthalenetetra-carboxylic acid compound with an ortho-diamine compound. The products thus obtainable are valuable dyestuffs, although they are not of uniform constitution, but rather represent mixtures of isomeric dyestuffs. When condensing, for instance, 1.4.5.8-naphthalenetetra-carboxylic acid with ortho-phenylenediamine a mixture of the two isomeric dyestuffs of the following formulae:

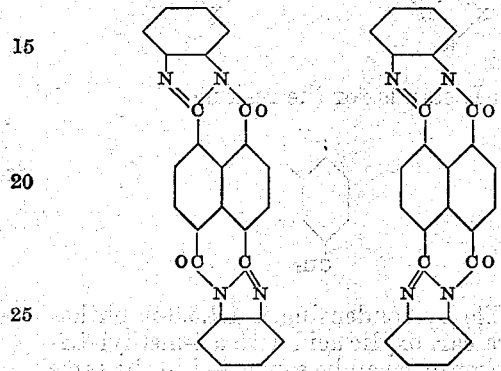

is obtained. When condensing a substituted ortho-phenylene-diamine with 1.4.5.8-naphthalenetetra-carboxylic acid in many cases the same holds true, i. e. there is likewise obtained a mixture of the two isomers.

The present invention relates to a process of separating the dyestuff mixtures obtainable according to U. S. Patent 1,588,451 into their two components. Another object of our invention is the purified dyestuffs obtainable according to our new process.

We have found that the dyestuff mixtures obtainable according to U. S. Patent 1,588,451 can be separated into their components by means of mono-chloro-acetic acid. In some cases it is possible to carry out the separation by treating the material at an elevated temperature with such a quantity of mono-chloro-acetic acid as is necessary to dissolve the more easily soluble component whereby the more difficultly soluble isomer remains in the residue and the dissolved isomer may be recovered by diluting or cooling the mono-chloracetic acid solution. In most cases, however, this plain method is not sufficient for effecting a complete separation of the isomeric dyestuffs. In these cases we prefer to proceed as follows:

We treat the dyestuff mixture with such a quantity of mono-chloro acetic acid as is sufficient to dissolve the greater part of the dyestuff mixture by which step of our process the more easily soluble component is completely going into solution and simultaneously a smaller part of the less easily soluble component is dissolved, whereas as the residue there remains the greater part of the less easily soluble isomeric dyestuff. In order to complete the separation we make use of our discovery that the acid salts of the isomeric dyestuffs possess more pronounced differences as to their solubility in mono-chloro acetic acid as the dyestuffs proper. We add to the reaction mixture such a quantity of an acid as is necessary to form the acid salts of the dyestuff components. The acid salt of the less soluble isomeric dyestuff is thus precipitated and the separation of the components is completed. After this we filter the solution from the residue and treat the filtrate as well as the residue with water, whereby from the residue the one component and from the filtrate the other component is obtained.

We have found that the acid salts formed by acting upon the dyestuffs with hydrochloric, hydrobromic or sulfuric acid are most suitable for the purposes of our invention.

We have furthermore found that in general one part by weight of the dyestuff mixture is to be treated with about 10 to 20 parts of mono-chloro acetic acid in order to dissolve the more easily soluble component and simultaneously a certain part of the less easily soluble dyestuff. We have found it preferable to carry out the treatment with mono-chloro acetic acid at a temperature of about 70° C.—100° C.

The following examples serve to illustrate the invention but they are not intended to limit it thereto, the parts being by weight:

(1) 10 parts of the mixture of the isomeric dyestuffs of the following compositions:

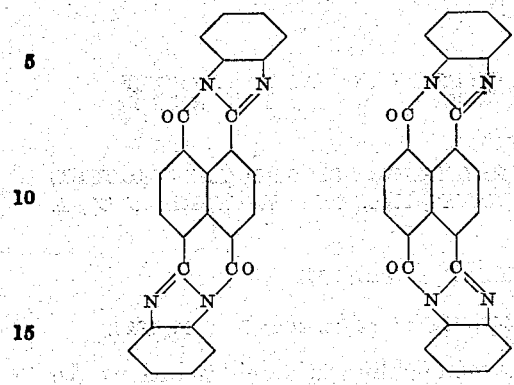

obtainable by condensing a 1.4.5.8-naphthalenetetra carboxylic acid with a 1.2-diaminobenzene according to U. S. Patent No. 1,588,451, are introduced into 200 parts of melted mono-chloro-acetic acid at a temperature of about 70° C. to 80° C. A part of the dyestuff mixture dissolves to a red solution. After some time, such a quantity of concentrated hydrochloric acid is added slowly as is necessary to form the hydrochlorides of the dyestuff components whereby the melted mass assumes a little lighter coloration. The more difficultly soluble hydrochloride at once begins to crystallize from the solution. When the precipitation is finished, the solid product is filtered by suction by means of filter stone, washed with melted mono-chloro acetic acid and the residue on the filter as well as the filtrate is treated with water at an elevated temperature in order to obtain the separated dyestuffs. From the yellowish brown residue on the filter there is obtained an orange dyestuff A and from the filtrate a red dye stuff B. They have the following formulæ:

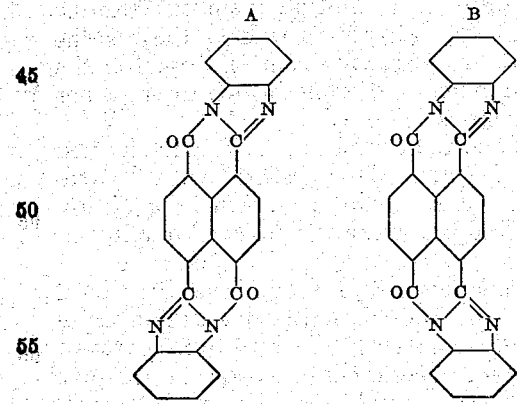

The orange dyestuff powder dissolves in monohydrate to a brownish solution and dyes cotton from an olive vat very brilliant orange tints of excellent fastness properties. The red dyestuff dissolves in concentrated sulfuric acid to a red solution and dyes cotton from an olive vat bluish red tints of very good fastness properties.

When treating the dyestuff mixture only with mono-chloro-acetic acid it may likewise be separated into its components, though not completely.

(2) By replacing in the process of separating the dyestuff mixtures as described in Example 1 the hydrochloric acid by the equivalent quantity of sulfuric acid the separation is effected in a very similar way with formation of the sulfates. Also by means of hydrobromides formed by causing concentrated hydrobromic acid to react with the solution in monochloro acetic acid of the dyestuff used in Example 1 the separation of the mixtures into their components may be carried out in like manner.

(3) The red mixture of the isomeric dyestuffs of the following compositions:

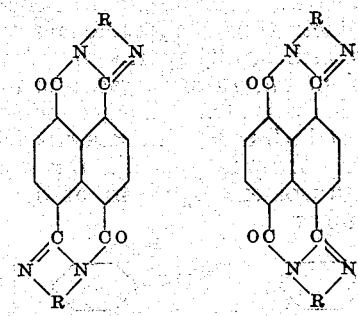

wherein R stands for the residue

obtainable by condensing a 1.4.5.8-naphthalenetetra-carboxylic acid with a 4-methyl-1.2-diaminobenzene can be separated in the same manner into its two components. The more difficultly soluble sulfate yields an orange dyestuff of the following formula:

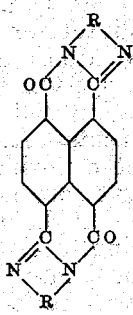

wherein R stands for the residue

which dyes cotton from a green hydrosulfite vat a clear orange red tint, whereas the dyestuff obtained from the filtrate which has the following formula:

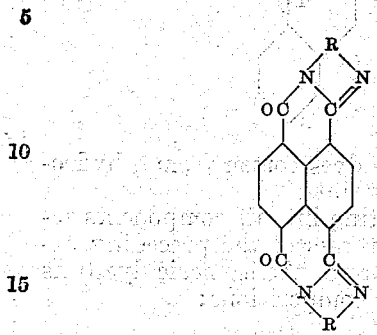

wherein R stands for the residue

and which is obtained in a larger yield than the orange dyestuff, dyes cotton in somewhat dull reddish brown tints.

(4) 10 parts of the mixture of the isomeric dyestuffs of the following compositions:

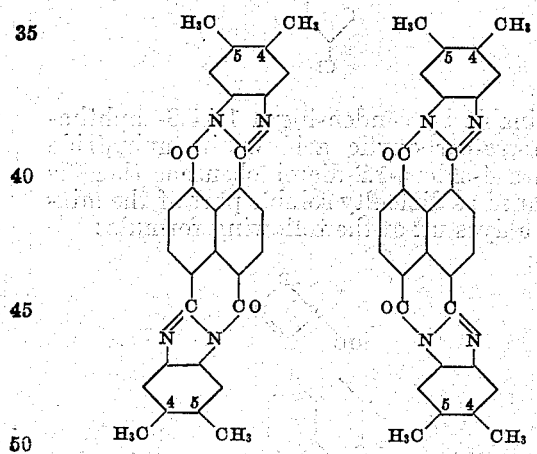

obtainable by condensing a 1.4.5.8-naphthalenetetra-carboxylic acid with a 4.5-dimethyl-1.2 diaminobenzene are dissolved partially in about 150 parts of melted mono-chloro-acetic acid and into this solution are slowly introduced at a temperature of from 70° C. to 100° C. 4, 3 parts of concentrated sulfuric acid or the equivalent quantity of hydrochloric acid. After the melted mass is stirred for about 1 hour the precipitated difficultly soluble sulfate or hydro-chloride, respectively, is filtered by suction and washed with a small quantity of melted mono-chloro-acetic acid. From the residue on the filter there is obtained by decomposition with water a red dyestuff which has the following formula:

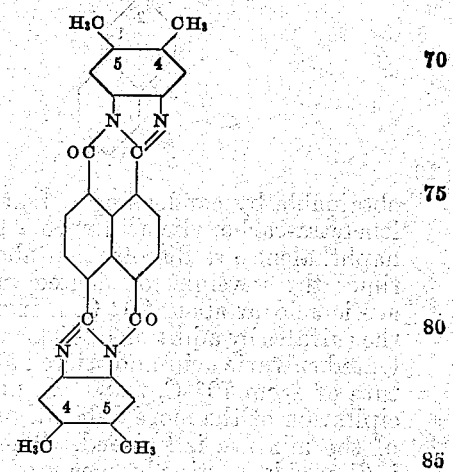

and dyes cotton from a green hydrosulfite vat red tints. From the deep red filtrate there is precipitated by addition of water a dark brownish violet precipitate which, when it is filtered by suction and dried, represents a dark brown dyestuff powder of the following formula:

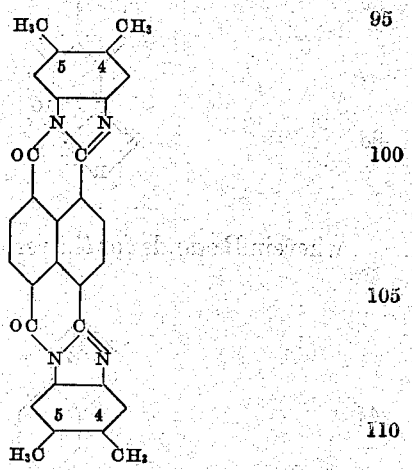

dyeing cotton from a hydrosulfite vat Bordeaux red tints.

(5) 100 parts of the mixture of the isomeric dyestuffs of the following compositions:

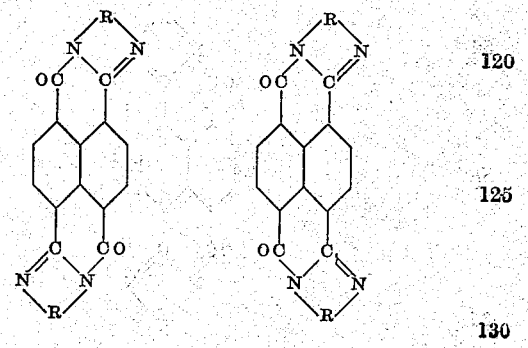

wherein R stands for the residue

obtainable by condensing a 1.4.5.8-naphthalenetetra-carboxylic acid with a 1.2-diaminonaphthalene are dissolved in about 15 to 20 times their weight of melted mono-chloroacetic acid at about 70° C. transformed into the sulfates by addition of 40 parts of concentrated sulfuric acid and stirred at a temperature of from 70° C. to 80° C. until the precipitation of the more difficultly soluble part of the mixture is finished. The precipitate is filtered by suction by means of a filter stone or asbestos. The residue yields a violet dyestuff of the following formula:

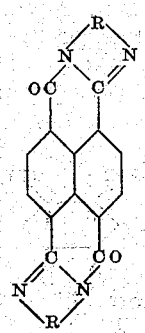

wherein R stands for the residue

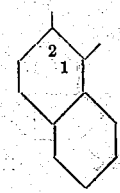

which dyes cotton from a hydrosulfite vat violet tints of good fastness properties. From the filtrate a dyestuff of the following formula:

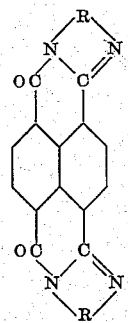

wherein R stands for the residue

is obtained which dyes cotton from a hydrosulfite vat currant tints.

(6) By separating into its components according to the process of the preceding examples the mixture of the isomeric dyestuffs of the following compositions:

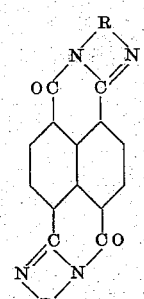 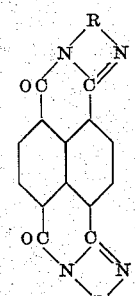

wherein R stands for the residue

obtainable by condensing a 1.4.5.8-naphthalenetetra-carboxylic acid or its anhydride with a 4-chloro-1.2-diaminobenzene there is obtained as difficulty soluble part of the mixture a dyestuff of the following formula:

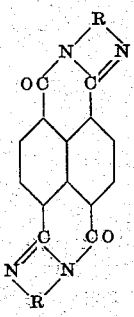

wherein R stands for the residue

which dyes cotton from an olive green hydrosulfite vat scarlet tints of good fastness properties. The mono-chloro-acetic acid filtrate yields a dyestuff of the following formula:

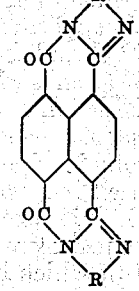

wherein R stands for the residue

which dyes cotton from an olive green vat brown shades.

(7) The red brown mixture of the isomeric dyestuffs of the following compositions:

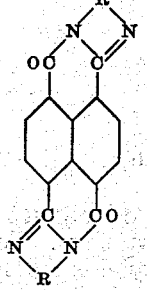 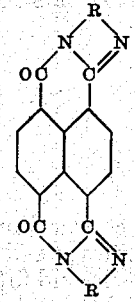

wherein R stands for the residue

obtainable by condensing a 1.4.5.8-naphthalenetetra-carboxylic acid and a 4-bromo-1.2-diaminobenzene can be separated in like manner into its components of which the more difficultly soluble one has the following formula:

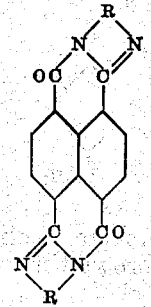

wherein R stands for the residue

and dyes cotton from an olive green hydrosulfite vat copper red tints. The more readily soluble isomer obtained from the filtrate has the following formula:

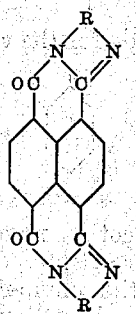

wherein R stands for the residue

and dyes cotton from an olive green vat brown shades.

(8) When the mixture of the isomeric dyestuffs of the following compositions:

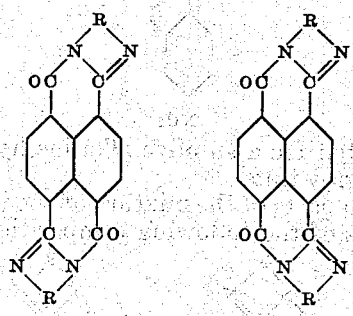 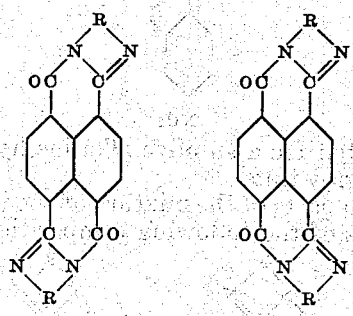

wherein R stands for the residue

obtainable by condensing a 1.4.5.8-naphthalenetetra-carboxylic acid with a 4-nitro-1.2-diaminobenzene is transformed into the sulfates or hydrochlorides of the dyestuff components by means of a mono-chloro-acetic acid solution or suspension, a difficultly soluble isomer separates which has the following formula:

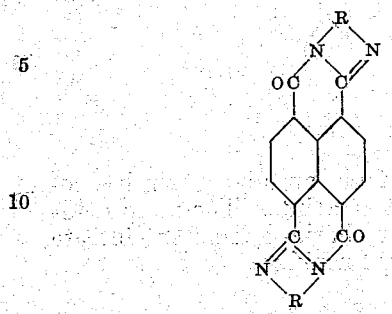

whereing R stands for the residue

and which dyes cotton from an olive hydrosulfite vat blue grey tints, whereas the isomer obtained from the mono-chloro-acetic acid filtrate which has the following formula:

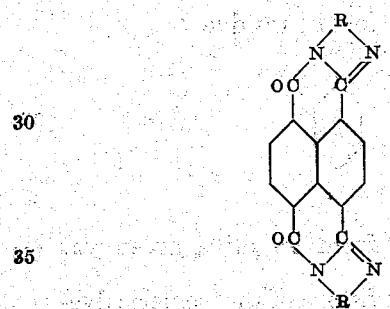

wherein R stands for the residue

dyes cotton from an olive alkaline hydrosulfite vat grey tints.

(9) 10 parts of the mixture of the isomeric dyestuffs of the following compositions:

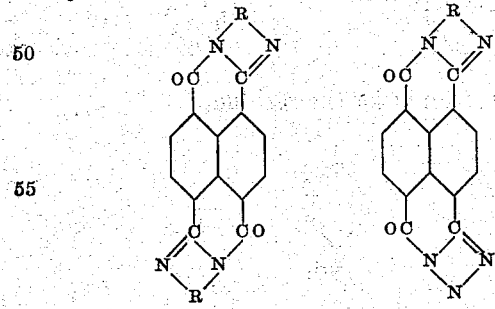

wherein R stands for the residue

obtainable by condensing a 1.4.5.8-naphthalenetetra-carboxylic acid or its anhydride with a 4-methoxy-1.2-diaminobenzene, are introduced in 10–12 times their weight of melted mono-chloro-acetic acid at a temperature of about 70° C. to 80° C. and the whole is stirred for some time. 4, 5 parts of sulfuric acid of 66° Bé. are then added drop by drop, stirring is continued for some time and the sulfate of the difficultly soluble dyestuff component which has separated is filtered by suction at 70° C. to 80° C. By decomposition with water there is obtained from the filtrate a reddish brown dyestuff which has the following formula:

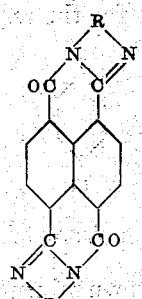

wherein R stands for the residue

and dyes cotton from an olive green alkaline hydrosulfite vat red brown tints. The monochloro-acetic acid filtrate yields a violet brown dyestuff of the following formula:

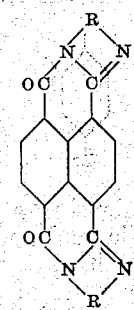

wherein R stands for the residue

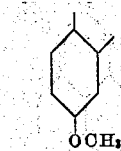

which dyes cotton from an olive green hydrosulfite vat violet brown tints of good fastness properties.

(10) The mixture of the isomeric dyestuffs of the following compositions:

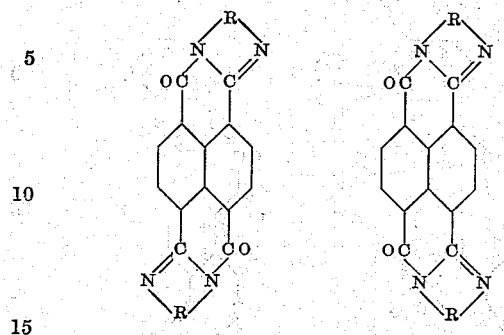

wherein R stands for the residue

obtainable by condensing a 4-ethoxy-1.2-diaminobenzene and a 1.4.5.8-nahpthalenetetra-carboxylic acid which is very similar to the mixture used in Example 9, can be separated in like manner into a red brown dyestuff A and a violet brown dyestuff B of the following formulæ:

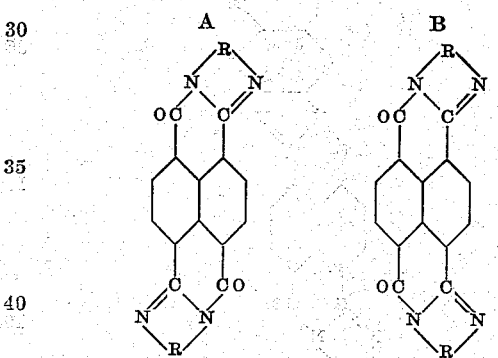

wherein R stands for the residue

Both of the components yield olive green vats same as the parent material.

(11) 10 parts of the mixture of the isomeric dyestuffs of the following compositions:

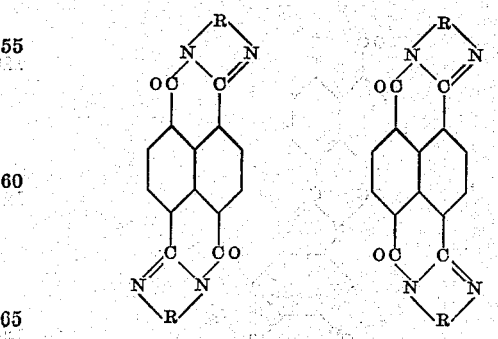

wherein R stand for the residue

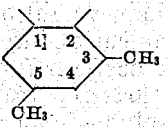

obtainable by condensing a 1.4.5.8-naphthalenetetra carboxylic acid with a 3.5-dimethyl-1.2-diaminobenzene, are introduced at about 70° C. into 150 parts of melted mono-chloro-acetic acid, the whole is stirred and such a quantity of sulfuric acid is added as is necessary to form the sulfates of the dyestuff components. When working up the residue and the filtrate there are obtained two dyestuffs A and B of the following formulæ:

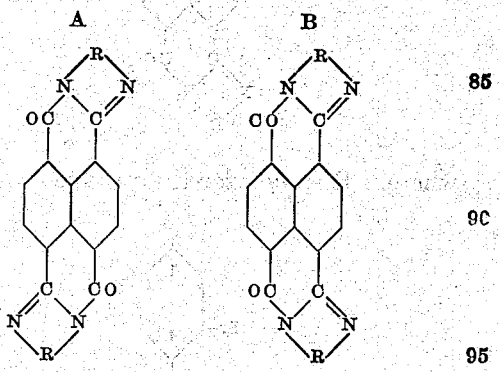

wherein R stands for the residue:

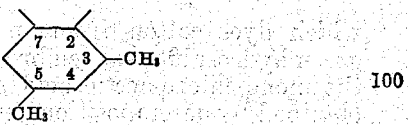

of which A dyes the cotton fiber from an olive green hydro-sulfite vat reddish violet tints and B from a likewise olive green vat bordeaux red tints.

(12) 10 parts of the mixture of the isomeric dyestuffs of the following compositions:

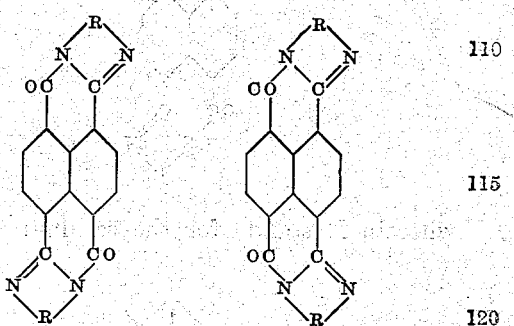

wherein R stand for the residue:

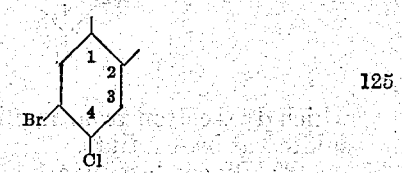

obtainable by condensing a 1.4.5.8-napthalenetetra-carboxylic acid with a 4-chloro-5- bromo-1.2-diaminobenzene are dispersed in about 10 times their weight of mono-chloro-acetic acid and converted into the sulfates at a temperature of between 70° C. and 80° C. by addition of 4 parts of sulfuric acid. After some time the insoluble isomer of the dyestuff components is filtered by suction and decomposed with water. It yields a red brown dyestuff of the following formula:

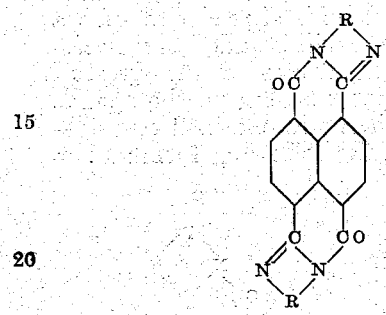

wherein R stands for the residue:

which dyes cotton from an alkaline olive green hydrosulfite vat red brown tints. From the mono-chloro-acetic acid filtrate there is obtained by decomposition with water a dyestuff of the following formula:

wherein R stands for the residue:

which dyes cotton from an olive green hydrosulfite vat brown tints.

(13) By condensing a 1.4.5.8-naphthalene-tetra-carboxylic acid or its anhydride with a 4.5-dichloro-1.2-diaminobenzene there is obtained a red brown mixture of the isomeric dyestuffs of the following compositions:

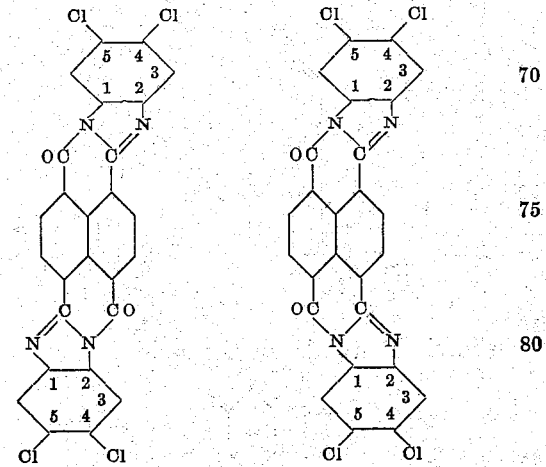

which mixture can be separated by means of sulfuric acid into a larger part of the dificultly soluble sulfate of the dyestuffs components and into a smaller part of the surfate which is easily going into solution. By decomposing both the sulfates with water there is obtained on the one hand a dyestuff of the following formula:

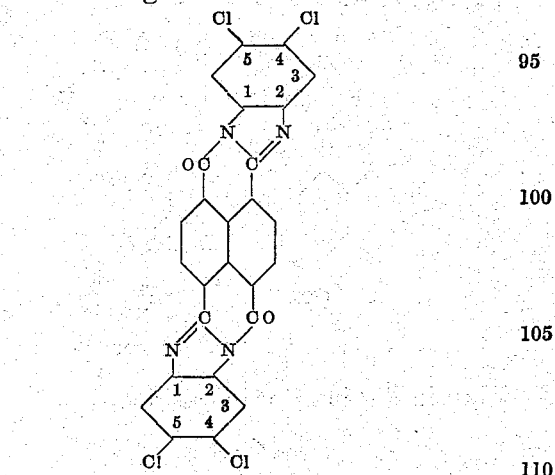

which dyes cotton in scarlet tints of very good fastness properties and on the other hand a product of the following formula:

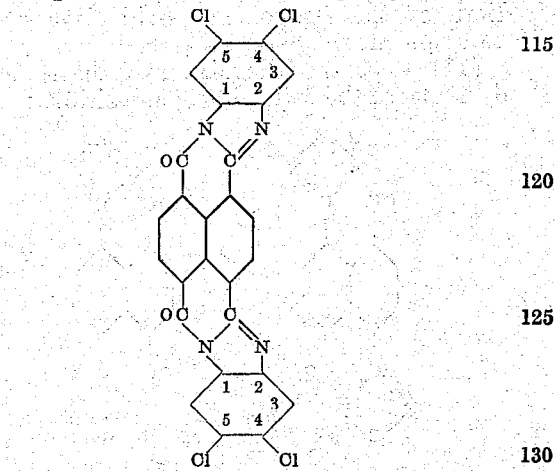

which dyes cotton brown tints. Both dyestuffs yield an olive green alkaline hydrosulfite vat.

We claim:

1. As new products the compounds of the following general formula:

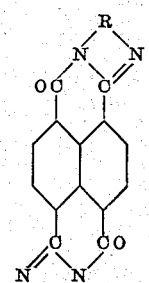

wherein R represents a phenylene group substituted by alkyl, alkoxy, halogen or nitro, or a naphthylene group, the arylene groups being bound in two adjacent positions to the nitrogen atoms, the said products being capable of yielding a vat from which cotton is dyed very fast tints.

2. As new products the compounds of the following general formula:

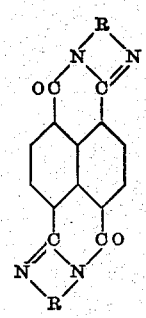

wherein R represents a phenylene group which is substituted by at least one substituent of the group consisting of alkyl, alkoxy, halogen and nitro, the said products being capable of yielding a vat from which cotton is dyed very fast tints.

3. The process of separating isomers which comprises heating with mono-chloro-acetic acid such a dyestuff mixture as is obtainable by condensing a 1.4.5.8-naphthalene-tetra-carboxylic acid compound with an o-diamine compound.

4. The process which comprises heating such a dyestuff mixture as is obtainable by condensing a 1.4.5.8-naphthalene-tetra-carboxylic acid compound with an aromatic o-diamine compound, with such a quantity of mono-chloro-acetic acid as is sufficient to dissolve the greater part of the said dyestuff mixture, adding to the reaction mixture a quantity of an acid capable of forming acid salts with the dyestuff components, filtering and treating the filtrate as well as the residue with water.

5. The process which comprises heating about 1 part by weight of one of the dyestuff mixtures obtainable by condensing a 1.4.5.8-naphthalene-tetra-carboxylic acid compound with an aromatic o-diamine compound, with about 10-20 parts by weight of mono-chloro-acetic acid at about 70° C.-100° C., adding about 4-5 parts by weight of concentrated sulfuric acid, filtering and treating the filtrate as well as the residue with water.

6. As a new product, the compound of the following probable formula:

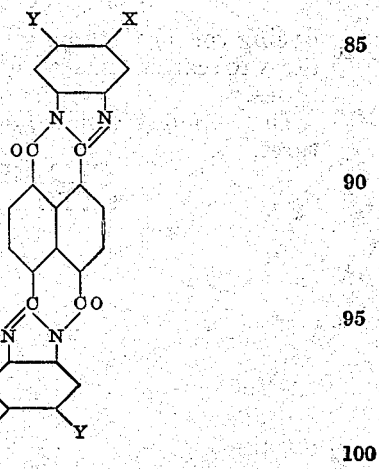

containing two methyl groups in X- or Y-positions, dyeing cotton from a green hydrosulfite vat a clear orange red tint.

7. As a new product, the compound of the following probable formula:

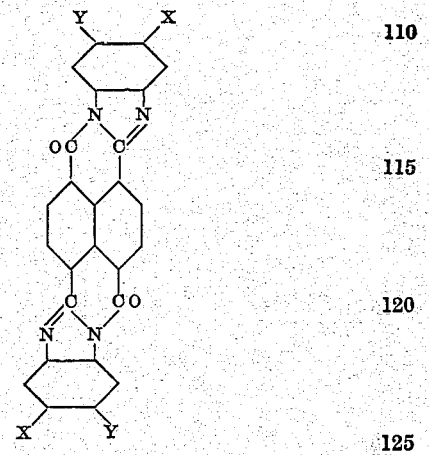

containing two chlorine atoms in X- or Y-positions dyeing cotton from an olive green hydrosulfite vat scarlet tints of good fastness properties.

8. As a new product, the compound of the following probable formula:
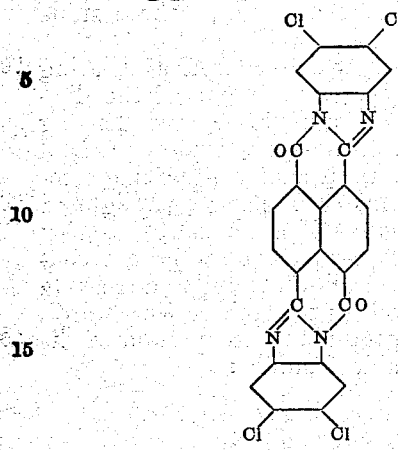
dyeing cotton from an olive green hydrosulfite vat scarlet tints of good fastness properties.
In testimony whereof, we affix our signatures.
WILHELM ECKERT.
OTTO BRAUNSDORF.